United States Patent
Sheflin et al.

(10) Patent No.: US 11,654,482 B2
(45) Date of Patent: May 23, 2023

(54) LIQUID METAL EJECTOR LEVEL SENSING SYSTEM AND METHODS THEREOF

(71) Applicant: XEROX CORPORATION, Norwalk, CT (US)

(72) Inventors: Joseph C. Sheflin, Macedon, NY (US); Jason M. LeFevre, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/367,991

(22) Filed: Jul. 6, 2021

(65) Prior Publication Data
US 2023/0008592 A1 Jan. 12, 2023

(51) Int. Cl.
B22D 46/00 (2006.01)
B33Y 50/02 (2015.01)
B33Y 10/00 (2015.01)
B22D 23/00 (2006.01)

(52) U.S. Cl.
CPC ........... B22D 46/00 (2013.01); B22D 23/003 (2013.01); B33Y 10/00 (2014.12); B33Y 50/02 (2014.12)

(58) Field of Classification Search
CPC ...... B41J 2/17566; B22F 10/22; B33Y 50/00; B22D 23/003
See application file for complete search history.

(56) References Cited

U.S. PATENT DOCUMENTS

| | | | | |
|---|---|---|---|---|
| 6,869,158 B2* | 3/2005 | Kojima | .................. | B41J 2/1755 347/7 |
| 7,040,728 B2* | 5/2006 | Merz | .................... | B41J 2/17566 347/85 |
| 7,185,960 B2* | 3/2007 | Farr | ..................... | B41J 2/17566 347/7 |
| 7,445,322 B2* | 11/2008 | Kitabatake | ........... | B41J 2/17553 347/86 |
| 7,562,952 B2* | 7/2009 | Yamamoto | ........... | B41J 2/17566 347/7 |
| 8,137,756 B2* | 3/2012 | Hori | ........................ | B41J 2/155 101/169 |

(Continued)

FOREIGN PATENT DOCUMENTS

| | | | |
|---|---|---|---|
| CN | 108380884 A | * | 8/2018 |
| DE | 102017208420 A1 | * | 11/2018 |
| KR | 20190113844 A | * | 10/2019 |

OTHER PUBLICATIONS

CN-108380884-A machine translation (Year: 2018).*
DE-102017208420-A1 machine translation (Year: 2018).*
KR20190113844A machine translation (Year: 2019).*

*Primary Examiner* — Michael W Hotchkiss
(74) *Attorney, Agent, or Firm* — MH2 Technology Law Group LLP

(57) ABSTRACT

A method of controlling sensing level in a liquid ejector is disclosed. The method includes filling a reservoir in communication with a liquid ejector with a printing material to a first level set point, receiving a drop out signal from a laser-based level sensor that reads from a surface of a melt pool in the reservoir, pausing an operation of the liquid ejector, adjusting the printing material level set point to a second level set point of printing material in reservoir that is higher than the first level set point, increasing a quantity of printing material in the reservoir to fill the reservoir to the second level set point, and resuming the operation of the liquid ejector.

14 Claims, 10 Drawing Sheets

(56) References Cited

U.S. PATENT DOCUMENTS

| | | | | |
|---|---|---|---|---|
| 10,753,781 | B2* | 8/2020 | Huang | B33Y 40/00 |
| 11,046,084 | B2* | 6/2021 | Cumbie | B41J 2/17566 |
| 2004/0011851 | A1* | 1/2004 | Howell | C22B 7/004 |
| | | | | 228/256 |
| 2004/0045694 | A1* | 3/2004 | Wiklund | B22D 11/181 |
| | | | | 164/450.4 |
| 2004/0223021 | A1* | 11/2004 | Farr | B41J 2/17566 |
| | | | | 347/19 |
| 2009/0219319 | A1* | 9/2009 | Houben | B41J 2/17593 |
| | | | | 347/88 |
| 2015/0314609 | A1* | 11/2015 | Bibl | B41J 2/14233 |
| | | | | 347/89 |
| 2017/0056966 | A1* | 3/2017 | Myerberg | B22F 12/00 |
| 2017/0266728 | A1* | 9/2017 | Johnson | B22F 12/55 |
| 2017/0341183 | A1* | 11/2017 | Buller | B29C 64/268 |
| 2017/0350745 | A1* | 12/2017 | Nagano | G21K 5/00 |
| 2018/0326661 | A1* | 11/2018 | Johnson | B29C 64/209 |
| 2019/0001575 | A1* | 1/2019 | Lopez | B29C 64/165 |
| 2019/0016054 | A1* | 1/2019 | Ding | G01F 25/20 |
| 2019/0105841 | A1* | 4/2019 | Zamorano | B29C 64/329 |
| 2021/0060864 | A1* | 3/2021 | Lishner | B41J 2/04508 |
| 2021/0255025 | A1* | 8/2021 | Huang | B33Y 40/00 |
| 2022/0161499 | A1* | 5/2022 | AbuShall | G01F 23/2928 |
| 2022/0410268 | A1* | 12/2022 | Perrone | B22F 12/60 |

\* cited by examiner

LIQUID METAL EJECTOR LEVEL SENSING SYSTEM AND METHODS THEREOF

TECHNICAL FIELD

The present teachings relate generally to liquid ejectors in drop-on-demand (DOD) printing and, more particularly, to a level sensing system and methods for use within a liquid metal ejector of a DOD printer.

BACKGROUND

A drop-on-demand (DOD) or three-dimensional (3D) printer builds (e.g., prints) a 3D object from a computer-aided design (CAD) model, usually by successively depositing material layer upon layer. A drop-on-demand (DOD) printer, particularly one that prints a metal or metal alloy, ejects a small drop of liquid aluminum alloy when a firing pulse is applied. Using this technology, a 3D part can be created from aluminum or another alloy by ejecting a series of drops which bond together to form a continuous part. For example, a first layer may be deposited upon a substrate, and then a second layer may be deposited upon the first layer. One particular type of 3D printer is a magnetohydrodynamic (MHD) printer, which is suitable for jetting liquid metal layer upon layer which bond together to form a 3D metallic object. Magnetohydrodynamic refers to the study of the magnetic properties and the behavior of electrically conducting fluids.

In MHD printing, a liquid metal is jetted out through a nozzle of the 3D printer onto a substrate or onto a previously deposited layer of metal. A printhead used in such a printer is a single-nozzle head and includes several internal components within the head which may need periodic replacement. In some instances, a typical period for nozzle replacement may be an 8-hour interval. During the liquid metal printing process, the aluminum and alloys, and in particular, magnesium containing alloys, can form oxides and silicates during the melting process in the interior of the pump. These oxides and silicates are commonly referred to as dross. The buildup of dross is a function of pump throughput and builds continuously during the print process. In addition to being composed of a combination of aluminum and magnesium oxides and silicates, the dross may also include gas bubbles. Consequently, the density of the dross may be lower than that of the liquid metal printing material and the dross may build at the top of the melt pool, eventually causing issues during printing. Certain DOD printers use, for example, a non-contact red-semiconductor laser sensor, operating at an approximate wavelength of 660 nm, for measuring the melt pool height during printing. This is commonly referred to as a level-sensor. Dross accumulation while printing impacts the ability of the level-sensor to accurately measure the molten metal level of the pump and may lead to prematurely ending the print job. This may also cause the pump to erroneously empty during printing, thereby ruining the part. Dross plugs may also grow within the pump causing issues with the pump dynamics resulting in poor jet quality and additional print defects, such as the formation of satellite drops during printing. The dross could potentially break apart and a chunk of this oxide falls into the nozzle resulting in a clogged nozzle. When the level sense signal "drops out," this can cause a catastrophic failure condition, leading to printer shut down, requiring clearing or removal of the dross plug, replacing the print nozzle, and beginning start-up procedures again.

Thus, a method of and apparatus for level sense control in a metal jet printing drop-on-demand or 3D printer is needed to provide longer printing times and higher throughput without interruption from defects or disadvantages associated with dross build-up.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method of controlling sensing level in a liquid ejector is disclosed. The method includes (a) filling a reservoir in communication with a liquid ejector with a printing material to a first level set point, (b) receiving a drop out signal from a laser-based level sensor that reads from a surface of a melt pool in the reservoir, (c) pausing an operation of the liquid ejector, (d) adjusting the printing material level set point to a second level set point of printing material in reservoir that is higher than the first level set point, (e) increasing a quantity of printing material in the reservoir to fill the reservoir to the second level set point, and (f) resuming the operation of the liquid ejector.

The method of controlling sensing level in a liquid ejector may further include wherein the printing material is in the form of a wire feed. The method of controlling sensing level in a liquid ejector may include removing the printing material wire feed from the reservoir. The printing material used in the method may include metal, metallic alloys, or a combination thereof. The printing material used in the method may include aluminum, aluminum alloys, or a combination thereof. The printing material may be a powder. The method of controlling sensing level in a liquid ejector may include determining a maximum melt pool height prior to filling the reservoir with a printing material to a first level set point. The maximum melt pool height in the method may be higher than the first level set point and the second level set point. The first level set point may be from about 4 mm to about 8 mm lower than the maximum melt pool height. The method of controlling sensing level in a liquid ejector may include confirming an absence of a drop out signal from the laser-based level sensor after filling the reservoir with a printing material to the second level set point. The second level set point may be from about 2 mm to about 4 mm higher relative to the first level set point. The method of controlling sensing level in a liquid ejector may include adjusting the printing material level set point to a third level set point of printing material in reservoir that is higher than the second level set point, and increasing the quantity of printing material in the reservoir to fill the reservoir to the third level set point. The method of controlling sensing level in a liquid ejector may include repeating any of the preceding steps.

Another method of controlling sensing level in a liquid ejector is disclosed. The method of controlling sensing level in a liquid ejector may also include filling a reservoir in communication with a liquid ejector with a printing material. The method of controlling sensing level in a liquid ejector may include reading a level signal from a surface of a melt pool in the reservoir using a sensor. The method of controlling sensing level in a liquid ejector may include coupling the level signal to the filling of the reservoir with the printing material. The method of controlling sensing level in a liquid ejector may include receiving a drop out signal from the sensor. The method of controlling sensing level in a liquid ejector may include pausing a jetting operation of the liquid ejector. The method of controlling sensing level in a liquid ejector may include increasing a quantity of printing material in the reservoir until the drop out signal is no longer received from the sensor. The method of controlling sensing level in a liquid ejector may include resuming the jetting operation of the liquid ejector.

The method of controlling sensing level in a liquid ejector may include a printing material in the form of a wire feed. The method of controlling sensing level in a liquid ejector may include uncoupling the level signal from the filling of the reservoir with the printing material prior to increasing the quantity of printing material in the reservoir. The method of controlling sensing level in a liquid ejector may include coupling the level signal to the filling of the reservoir with the printing material prior to resuming the jetting operation of the liquid ejector.

Another method of controlling sensing level in a liquid ejector is disclosed. The method also includes (a) filling a reservoir in communication with a liquid ejector with a printing material to a first level set point, (b) receiving a drop out signal from a laser-based level sensor that reads from a surface of a melt pool in the reservoir, (c) pausing an operation of the liquid ejector, (d) adjusting the printing material level set point to a second level set point of printing material in reservoir that is higher than the first level set point, (e) increasing a quantity of printing material in the reservoir to fill the reservoir to the second level set point, (f) resuming the operation of the liquid ejector. The method of controlling sensing level in a liquid ejector may include where the printing material is a wire feed which may include a metal, a metallic alloy, or a combination thereof. The method of controlling sensing level in a liquid ejector may include confirming an absence of a drop out signal from the laser-based level sensor after filling the reservoir with a printing material to the second level set point. The method of sensing level in a liquid ejector may include repeating any of the aforementioned steps.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
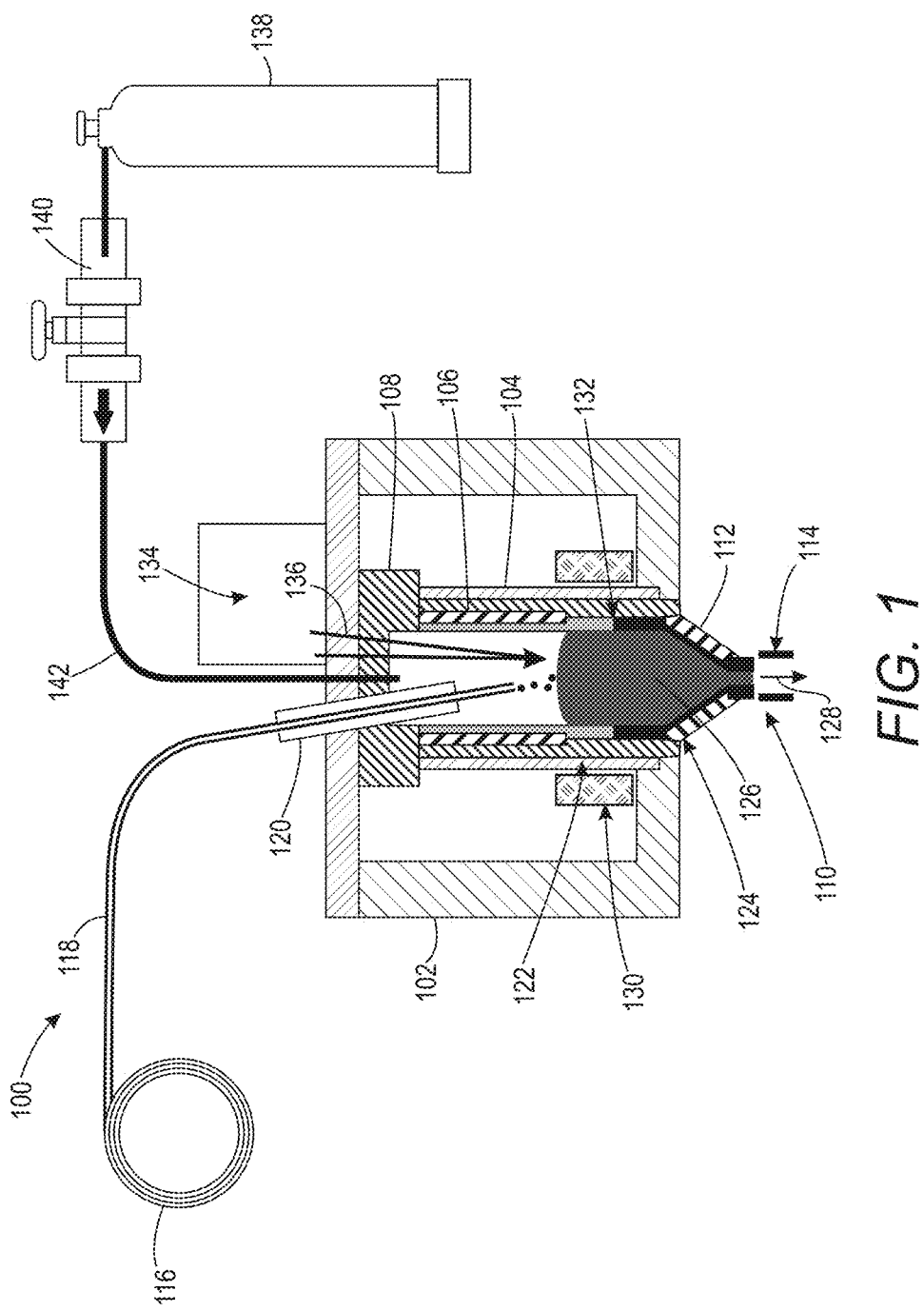
FIG. 1 depicts a schematic cross-sectional view of a single liquid ejector jet of a 3D printer (e.g., a MHD printer and/or multi jet printer), according to an embodiment.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

In drop-on-demand (DOD) or three-dimensional (3D) a small drop of liquid aluminum or other metal or metal alloy are ejected when a firing pulse is applied. Using this printing technology, a 3D part can be created from aluminum or another alloy by ejecting a series of drops which bond together to form a continuous part. During a typical printing operation, the raw printing material wire feed can be replenished to the pump inside an ejector using a continuous roll of aluminum wire. The wire printing material may be fed into the pump using standard welding wire feed equipment or other means of introduction, such as a powder feed system. As printing occurs and new material is fed into the pump, a contaminant known as dross may accumulate in the top of the upper pump of the ejector. This build-up of dross is a function of the total throughput of printing material through the pump and ejector. As the dross contamination builds within the pump and/or ejector it eventually results in defects such as degraded jetting performance, nozzle or machine contamination, level sensor faults, additional printer maintenance, shut down, or contamination related catastrophic failure. While systems exist to counteract dross accumulation in similar ejector and printer systems, they are fairly complex and require manual operations involving multiple operators.

Disclosed herein is a method using a control scheme and order of operations that changes the level of the pump in-situ during the print job. During typical operations, a level set point is maintained during operation of the printer to ensure consistent operation and adequate quantities of printing material within the inner cavity or pump section(s) of a metal jet printer. This level set point is continuously monitored by an optical or laser-based measurement signal, wherein the signal is coupled to a closed-loop control algorithm configured to continuously introduce or add additional printing material to the ejector to maintain the set level as printing material is depleted from the ejector by printing operations. In embodiments disclosed herein, if this level-sense signal "drops-out," receives a "drop-out" signal or in other words cannot measure the top surface of the melt pool due to dross accumulation, the print job is paused, and the wire feed is taken out of closed-loop control. This drop-out signal occurs due to a rough, irregular surface of dross at the top of a melt pool within the ejector, as compared to the shiny, smooth, reflective surface of a typical metallic melt pool surface. This can further be attributed to the composition of dross, which is largely composed of oxides, contaminants, and other impurities in the printing material formed by thermal reaction with atmosphere and/or other contaminants. As a drop-out signal is received, the pool height may be increased to a second level set point, for example, 2 mm above the first level set point, with fresh printing material such as aluminum. As fresh aluminum printing material is fed into the pump covers the dross, this provides a new molten surface that the level-sense measurement device or system can now measure. This method acts to rejuvenate the pump such that the sensor can get a signal back from the molten aluminum pool, resulting in the absence of the previous "drop-out" signal. At this point, the wire feed or powder feed may be put back into closed-loop control at the new set point, and the part printing can be resumed with minimal delay in operation. This procedure or method can be performed multiple times during a print job until a "max pool height" is reached, such that the pump is not overfilled. This filling the pump or changing the pump set level on the order of millimeters does not alter the jetting quality or negatively impact jetting performance.

FIG. 1 depicts a schematic cross-sectional view of a single liquid ejector jet of a 3D printer (e.g., a MHD printer and/or multi jet printer), according to an embodiment. FIG. 1 shows a portion of a type of drop-on-demand (DOD) or three-dimensional (3D) printer 100. The 3D printer or liquid ejector jet system 100 may include an ejector (also referred to as a body or pump chamber, or a "one-piece" pump) 104 within an outer ejector housing 102, also referred to as a lower block. The ejector 104 may define an inner volume 132 (also referred to as an internal cavity). A printing material 126 may be introduced into the inner volume 132 of the ejector 104. The printing material 126 may be or include a metal, a polymer, or the like. For example, the printing material 126 may be or include aluminum or aluminum alloy, introduced via a printing material supply 116 or spool of a printing material wire feed 118, in this case, an aluminum wire. The liquid ejector jet system 100 further includes a first inlet 120 within a pump cap or top cover portion 108 of the ejector 104 whereby the printing material wire feed 118 is introduced into the inner volume 132 of the ejector 104. The ejector 104 further defines a nozzle 110, an upper pump 122 area and a lower pump 124 area. One or more heating elements 112 are distributed around the pump chamber 104 to provide an elevated temperature source and maintain the printing material 126 in a molten state during printer operation. The heating elements 112 are configured to heat or melt the printing material wire feed 118, thereby changing the printing material wire feed 118 from a solid state to a liquid state (e.g., printing material 126) within the inner volume 132 of the ejector 104. The three-dimensional 3D printer 100 and ejector 104 may further include an air or argon shield 114 located near the nozzle 110, and a water coolant source 130 to further enable nozzle and/or ejector 104 temperature regulation. The liquid ejector jet system 100 further includes a level sensor 134 system which is configured to detect the level of molten printing material 126 inside the inner volume 132 of the ejector 104 by directing a detector beam 136 towards a surface of the printing material 126 inside the ejector 104 and reading the reflected detector beam 136 inside the level sensor 134.

The 3D printer 100 may also include a power source, not shown herein, and one or more metallic coils 106 enclosed in a pump heater that are wrapped at least partially around the ejector 104. The power source may be coupled to the coils 106 and configured to provide an electrical current to the coils 106. An increasing magnetic field caused by the coils 106 may cause an electromotive force within the ejector 104, that in turn causes an induced electrical current in the printing material 126. The magnetic field and the induced electrical current in the printing material 126 may create a radially inward force on the printing material 126, known as a Lorenz force. The Lorenz force creates a pressure at an inlet of a nozzle 110 of the ejector 104. The pressure causes the printing material 126 to be jetted through the nozzle 110 in the form of one or more liquid drops 128.

The 3D printer 100 may also include a substrate, not shown herein, that is positioned proximate to (e.g., below) the nozzle 110. The ejected drops 128 may land on the substrate and solidify to produce a 3D object. The 3D printer 100 may also include a substrate control motor that is configured to move the substrate while the drops 128 are being jetted through the nozzle 110, or during pauses between when the drops 128 are being jetted through the nozzle 110, to cause the 3D object to have the desired shape and size. The substrate control motor may be configured to move the substrate in one dimension (e.g., along an X axis), in two dimensions (e.g., along the X axis and a Y axis), or in three dimensions (e.g., along the X axis, the Y axis, and a Z axis). In another embodiment, the ejector 104 and/or the nozzle 110 may be also or instead be configured to move in one, two, or three dimensions. In other words, the substrate may be moved under a stationary nozzle 110, or the nozzle 110 may be moved above a stationary substrate. In yet another embodiment, there may be relative rotation between the nozzle 110 and the substrate around one or two additional axes, such that there is four or five axis position control. In certain embodiments, both the nozzle 110 and the substrate may move. For example, the substrate may move in X and Y directions, while the nozzle 110 moves up and/or down in a Y direction.

The 3D printer 100 may also include one or more gas-controlling devices, which may be or include a gas source 138. The gas source 138 may be configured to introduce a gas. The gas may be or include an inert gas, such as helium, neon, argon, krypton, and/or xenon. In another embodiment, the gas may be or include nitrogen. The gas may include less than about 10% oxygen, less than about 5% oxygen, or less than about 1% oxygen. In at least one embodiment, the gas may be introduced via a gas line 142 which includes a gas regulator 140 configured to regulate the flow or flow rate of one or more gases introduced into the three-dimensional 3D printer 100 from the gas source 138. For example, the gas may be introduced at a location that is above the nozzle 110 and/or the heating element 112. This may allow the gas (e.g., argon) to form a shroud/sheath around the nozzle 110, the drops 128, the 3D object, and/or the substrate to reduce/prevent the formation of oxide (e.g., aluminum oxide) in the form of an air shield 114. Controlling the temperature of the gas may also or instead help to control (e.g., minimize) the rate that the oxide formation occurs.

The liquid ejector jet system 100 may also include an enclosure 102 that defines an inner volume (also referred to as an atmosphere). In one embodiment, the enclosure 102 may be hermetically sealed. In another embodiment, the enclosure 102 may not be hermetically sealed. In one embodiment, the ejector 104, the heating elements 112, the power source, the coils, the substrate, additional system elements, or a combination thereof may be positioned at least partially within the enclosure 102. In another embodiment, the ejector 104, the heating elements 112, the power source, the coils, the substrate, additional system elements, or a combination thereof may be positioned at least partially outside of the enclosure 102.

Figure 2:
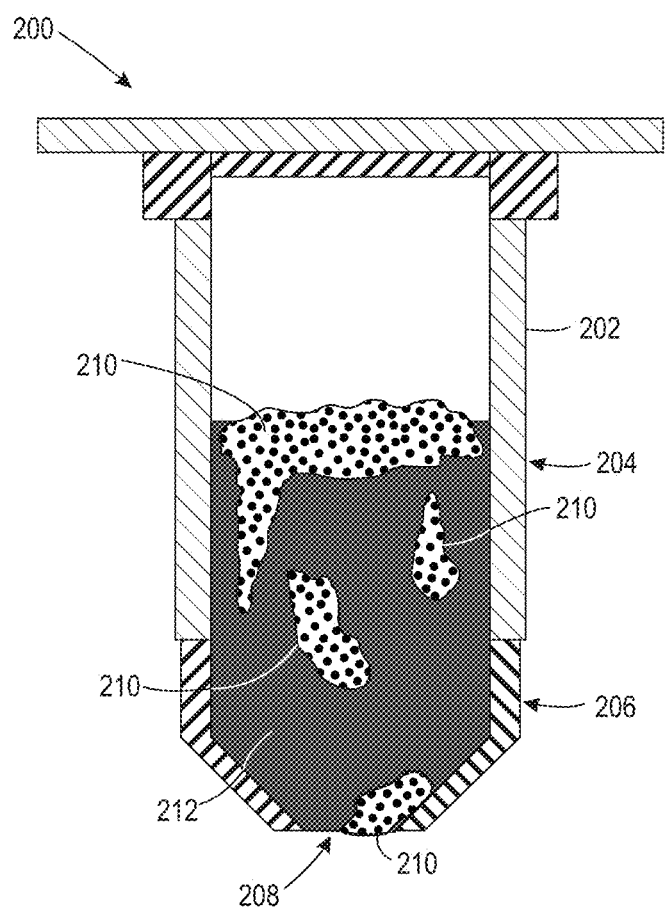
FIG. 2 is a side cross-sectional views of a liquid ejector jet contaminated with dross, according to an embodiment.

FIG. 2 is a side cross-sectional views of a liquid ejector jet contaminated with dross, according to an embodiment. The ejector 200 is shown, which further defines a cavity or outer wall 202 of the ejector, an upper pump area 204, a lower pump area 206, and an outlet nozzle 208. Within the inner cavity 202 of the ejector 200 is further shown a molten printing material 212 and schematic of dross 210 build-up within and on top of the printing material 212. The dross 210, in certain embodiments, and dependent upon which printing material is used in the printing system, is a combination of aluminum oxides, magnesium oxides, and silicates. The dross 210 may also include gas bubbles. In certain embodiments, the dross 210, may include additional materials or contaminants, such as oxides and silicates of aluminum (Al), calcium (Ca), magnesium (Mg), silicon (Si), iron (Fe), or possibly air bubbles or other contaminants containing sodium (Na), potassium (K), sulfur (S), chlorine (Cl), carbon (C) or combinations thereof, The dross 210 typically builds towards the top of the melt pool that resides near the upper pump area 204 in the ejector 200 and may potentially cause issues during printing. Dross 210 accumulation may potentially impact the ability of the aforementioned level sensor that measures the molten metal level inside the ejector 200. An erroneous signal for the level sensor system can cause the pump to empty during printing, which could result in ruining the part being printed. One or more dross 210 "plugs" may also have a propensity to grow within the pump, which in turn may cause issues with the pump dynamics. Interruptions or issues in pump dynamics may further result in poor jet quality and the formation of satellite drops during printing. A satellite drop may refer to a drop with only a fraction of the volume of the main drop which can be unintentionally formed during the jetting of a main drop. For example, a physical occlusion at the nozzle is one potential cause resulting in the formation of a satellite drop. In certain embodiments or instances, the dross 210 could also potentially break apart, and a portion of this fragmented dross or oxide may fall into the nozzle 208 resulting in a clogged nozzle 208. Any failure arising from the accumulation of dross 210 has the tendency to be catastrophic, which could lead to necessitating a shut down of the printer, having to clear or remove the dross 210 plug, replacing the print nozzle, beginning start-up again, or combinations thereof.

Figure 3A:
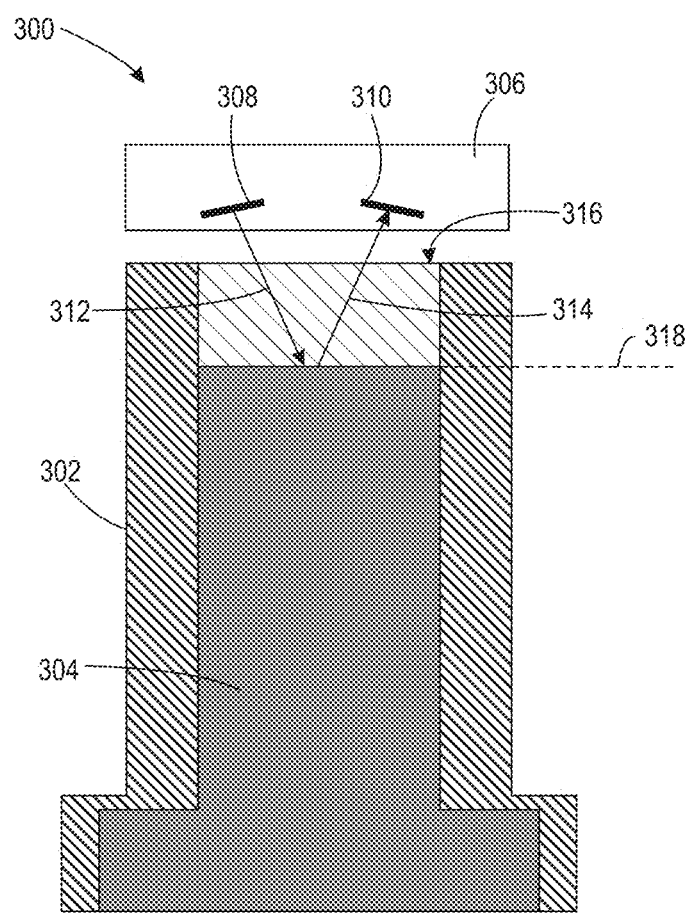
FIGS. 3A-3F are a series of side cross-sectional views of an upper pump section of a single liquid ejector jet with a level sensing system, illustrating operative steps of the level sensing system, according to an embodiment.

FIGS. 3A-3F are a series of side cross-sectional views of an upper pump section of a single liquid ejector jet with a level sensing system, illustrating operative steps of the level sensing system, according to an embodiment. FIG. 3A is a side cross-sectional view of an upper pump section of a print head ejector or single liquid ejector jet, similar to the one illustrated in FIG. 1, with a level sensing system. A liquid ejector jet with a level sensing system 300 is shown, having a quantity of molten printing material supply 304 held within a pump or liquid ejector body 302. Certain embodiments of such an ejector may have the printing material supply located internal to a housing that includes the liquid ejector. Furthermore, alternate embodiments may include other means of introduction of printing material, such as a powder feed system or other printing material introduction means known to those skilled in the art. Example printing materials which could be ejected using a liquid ejector according to embodiments described herein also include alloys of aluminum, copper, iron, nickel, brasses, naval brass, and bronzes. Silver and alloys thereof, copper and alloys thereof, metallic alloys, braze alloys, or combinations thereof may also be printed using liquid ejectors according to embodiments herein.

The level sense system including liquid ejector 300 further includes a level sense measurement device 306 capable of measuring the surface of a melt pool comprised of the printing material supply 304. Suitable measurement protocols for such a level sensing system and measurement device 306 include optical or laser distance measurement devices or systems. The level sense measurement device 306 includes an outgoing detection source 308 which directs an emitted detector signal 312 towards the surface of the melt pool comprised of the printing material supply 304 and a return detector signal 314 that is reflected off a shiny, reflective surface of the melt pool comprised of the printing material supply 304. Further indicated in FIG. 3A is a height or setpoint corresponding with an inner cavity or reservoir maximum level 316 and a first level set point 318. During normal operation of the level sense system including liquid ejector 300, additional printing material from the external supply of the printing material will be introduced into the pump or liquid ejector body 302 as printing operations continue and printing material is ejected from the level sense system including liquid ejector 300. The level sense measurement device 306 provides feedback via a closed loop control signal to the external supply of the printing material to provide additional printing material as printing material is depleted. The target level to be maintained during this normal operation is at the initial or first level set point 318.

Figure 3B:
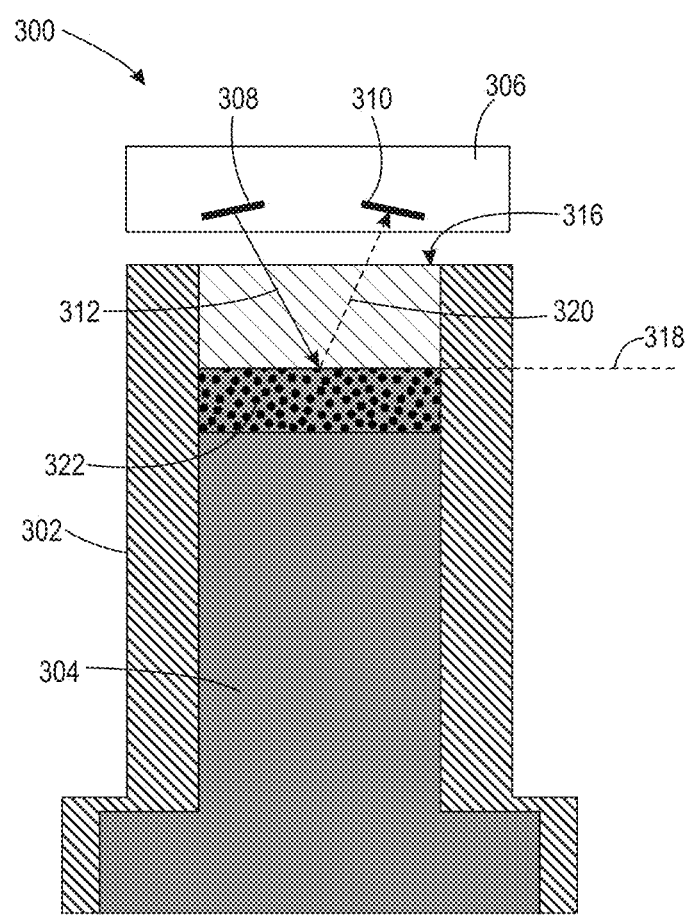
Figure 3C:
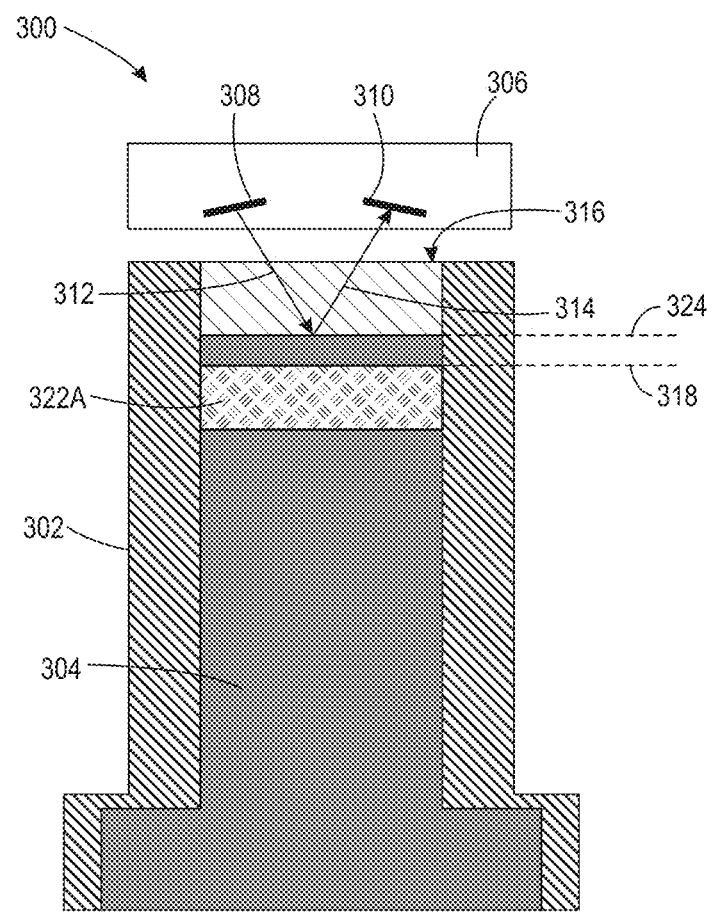

FIG. 3B illustrates a side cross-sectional view of an upper pump section of a print head ejector or single liquid ejector jet, with a level sensing system having an accumulation of dross 322 inside the or liquid ejector body 302 of the liquid ejector 300. As dross 322 accumulates in the liquid ejector body 302, the surface of the melt pool of the molten printing material 304 becomes irregular and/or dull due to the composition and appearance of the dross 322, and therefore generates an erroneous or disrupted return detector signal 320 to be fed back or returned to the incoming detection source 310 of the level sense measurement device 306. This "drop-out" signal then serves as a signal or trigger for the level sense system to take the introduction of fresh printing material out of the closed loop control scheme as previously described. At this point, as shown in FIG. 3C, a second level set point 324 is then set or determined by the level sense system via calculation or algorithm or step function or predetermined indication set within the computer control or software settings in the overall printer or ejector control operation system. A second level set-point is determined using the first level set-point, and then adding to it a predetermined increase (e.g. 2 mm) resulting in a new level that the closed-loop feed-back control will control to going forward. This increase cannot however result in a new set-point that exceeds the maximum fill level of the pump. Using the diameter of the wire, the input feed rate of the wire and the change in volume between the first level set-point and the second level set-point, an algorithm can determine the desired amount of wire needed to fill the pump to second level set-point. For example, the second level set point 324 may be 2 mm higher than the first level set point 318. Certain embodiments may have a second level set point 324 that could be from about 0.5 mm to about 20 mm, from about 2 mm to about 10 mm, or from about 2 mm to about 6 mm higher than the first level set point 318. Additional printing material is then delivered into the liquid ejector body 302 to cover the dross 322A accumulated in the liquid ejector body 302 during the previous operation. This open loop delivery of additional printing material 304 covers the accumulated dross 322A and refreshes and replenishes the surface of the melt pool of the printing material 304 inside the liquid ejector body 302. The previously detected drop-out signal or erroneous or disrupted return detector signal 320 is replaced once more with a clean and uninterrupted return detector signal 314, allowing for accurate level sense of the level of printing material 304 in the liquid ejector body 302. At this point, the delivery of printing material 304 returns to a closed loop scenario and normal printing operation resumes with the printing material level set to the second level set point 324, as shown in FIG. 3D.

Figure 3D:
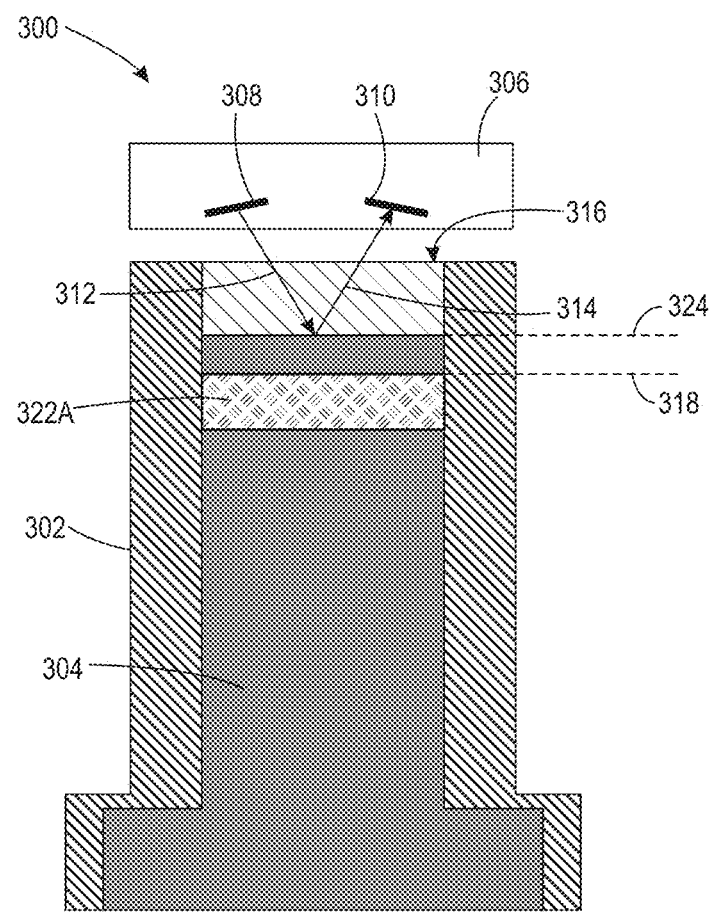
Figure 3E:
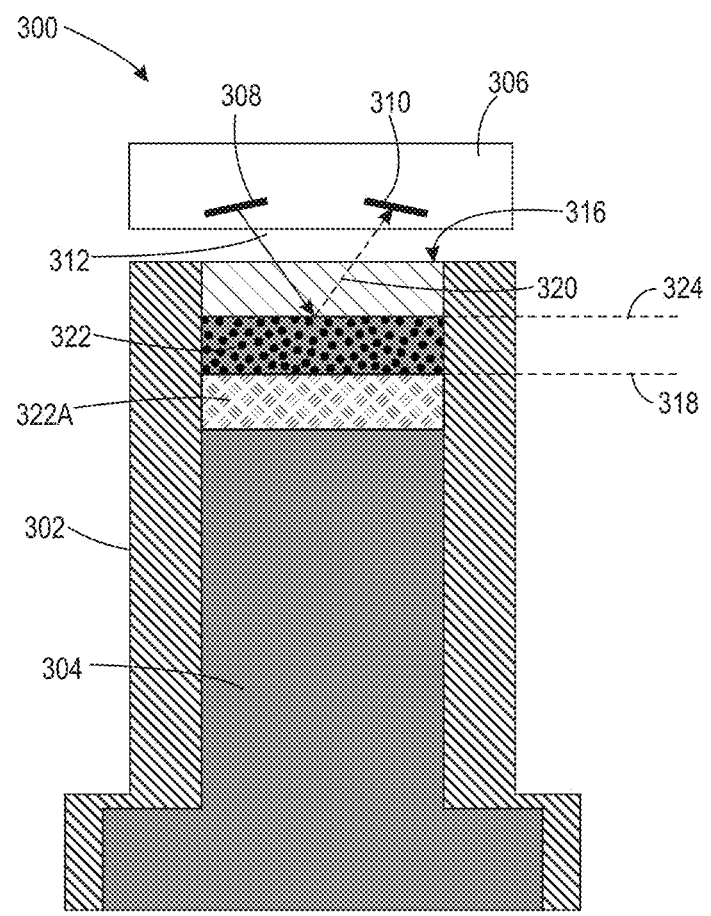

FIG. 3E illustrates a step in the operation of the liquid ejector with level sense system 300 showing an additional layer of dross 322, which has now accumulated on top of the previously accumulated dross 322A after continued operation as shown in FIG. 3D. The accumulated dross 322A which had previously been covered in the steps shown in FIGS. 3A-3C, is now covered with a new layer of dross 322. Once more, the return detector signal 314 is interrupted, and a drop-out return detector signal 320 is detected by the level sense measurement device 306, indicating that sufficient dross build up has been detected by the level sense measurement device 306.

Figure 3F:
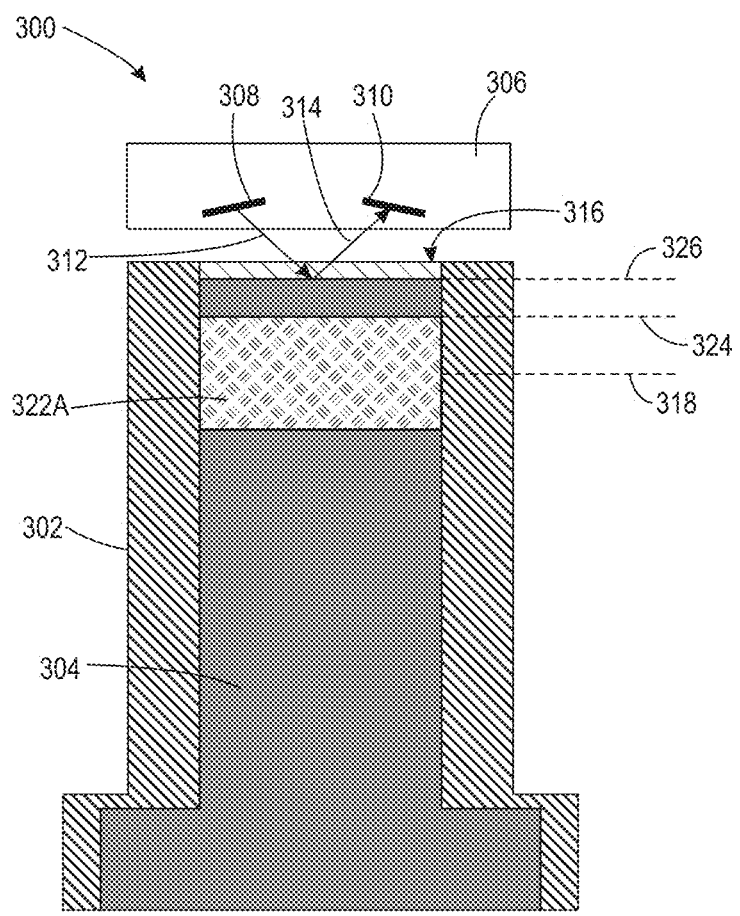

At this point, as shown in FIG. 3F, a third level set point 326 is then set or determined by the level sense system via calculation or algorithm or step function or predetermined indication set within the computer control or software settings in the overall printer or ejector control operation system. A third level set-point is determined using the second level set-point, and then adding to it a predetermined increase (e.x. 2 mm) resulting in a new level that the closed-loop feed-back control will control to going forward. This increase cannot however result in a new set-point that exceeds the maximum fill level of the pump. Using the diameter of the wire, the input feed rate of the wire and the change in volume between the second level set-point and the third level set-point, an algorithm can determine the desired amount of wire needed to fill the pump to second level set-point. For example, the third level set point 326 may be 2 mm higher than the second level set point 324. Certain embodiments may have a third level set point 326 that could be from about 0.5 mm to about 20 mm, from about 2 mm to about 10 mm, or from about 2 mm to about 6 mm higher than the second level set point 324. Additional printing material is then delivered into the liquid ejector body 302 to cover the dross 322A accumulated in the liquid ejector body 302 during the previous operations. This open loop delivery of additional printing material 304 covers the accumulated dross 322A and refreshes and replenishes the surface of the melt pool of the printing material 304 inside the liquid ejector body 302. The previously detected drop-out signal or erroneous or disrupted return detector signal 320 is replaced once more with a clean and uninterrupted return detector signal 314, allowing for accurate level sense of the level of printing material 304 in the liquid ejector body 302. At this point, the delivery of printing material 304 returns to a closed loop scenario and normal printing operation resumes with the printing material level set to the third level set point 326. It should be noted that the inner cavity or reservoir maximum level 316 is higher than the third level set point 326, yet all level set points 318, 324, 326 as well as the inner cavity or reservoir maximum level 316 may be variable based on the specific dimensions of the inner cavity or throughput designed for a given printer and/or liquid ejector system.

The operation or method steps and apparatus described in regard to FIGS. 3A-3F illustrate the use of a control scheme that changes the level of the pump in-situ during a print job. The dross accumulation causes the laser of the level-sensor to scatter due to the rough nature of the dross surface atop the melt pool of printing material. This scattered drop-out signal prevents the sensor from reading the true height of the melt pool as the signal may become intermittent, and eventually completely drop out from the scattering. Once the dross is covered up with fresh molten aluminum this will allow the sensor to function anew and as intended. When the level-sense "drops-out" or cannot measure the top surface of the melt pool due to dross accumulation the print job is paused and the wire feed or printing material supply is taken out of closed-loop control. The pool height is increased by an amount, for example, 2 mm, with fresh aluminum material to the second setpoint level. While it has been demonstrated that an additional 2 mm is required to completely cover the dross reliably to attain a good level sense signal again, other levels may be feasible or effective based on the specific design attributes of a specific printing system. The fresh aluminum material that is fed into the pump or inner cavity covers the dross, providing a molten fresh smooth surface that the sensor can now measure. This acts to rejuvenate the pump in a manner such that the sensor can receive a clear signal back from the surface of the molten aluminum or other printing material melt pool. The wire feed or other printing material supply is put back into closed-loop control at the new set point. At this point the part printing can be resumed. This procedure can be performed multiple times during the print job until a maximum pool height is reached. It should be further noted that the level of the pool height does not affect the jetting performance such that there is no degradation in print performance from rejuvenating the level sense via the system and method described herein.

Figure 4:
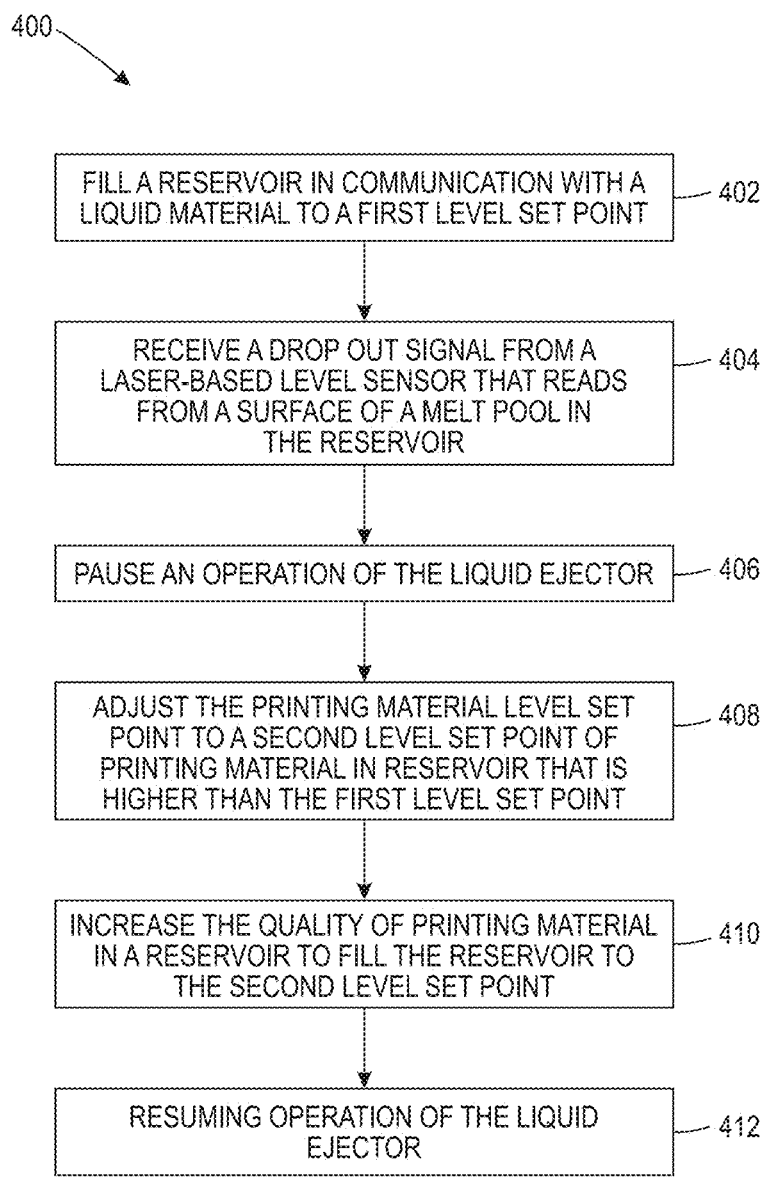
FIG. 4 is a flowchart illustrating a method of level sensing in an upper pump area of a liquid ejector of a metal jetting printer, according to an embodiment.

FIG. 4 is a flowchart illustrating a method of level sensing in an upper pump area of a liquid ejector of a metal jetting printer, according to an embodiment. A method of controlling sensing level in a liquid ejector 400 is illustrated, which includes a step to fill a reservoir in communication with a liquid ejector with a printing material to a first level set point 402. During a typical printing operation, the level sense system may receive a drop out signal from a laser-based level sensor that reads from a surface of a melt pool in the reservoir 404 and as a result, pause an operation of the liquid ejector 406. The drop out signal received from the laser-based level sensor reading from a surface of a melt pool in the reservoir 404 is disrupted by the presence of dross on the surface of the melt pool within the liquid ejector of the metal jetting printer. As stated previously, this dross contamination on the surface of the melt pool may interrupt accurate level sense readings or cause abnormal filling or printing operations within the metal jetting printer, particularly in the ejector. Next, the level sense system may direct the metal jetting printer to adjust the printing material level set point to a second level set point of printing material in reservoir that is higher than the first level set point 408, and subsequently increase the quantity of printing material in the reservoir to fill the reservoir to the second level set point 410. Once this second level set point is reached, and the level of molten printing material in the liquid ejector has risen to the second level set point, which is ostensibly at a higher level and would successfully cover any dross contamination on the surface of the melt pool, thus restoring correct operation of the level sense system, free of drop out signals or erroneous readings, the level sense system would then initiate a signal to resume the operation of the liquid ejector 412.

In certain embodiments of the method of controlling sensing level in a liquid ejector, the printing material is in the form of a wire feed, while alternate embodiments may utilize printing material made from powder or liquid. The printing material may be composed of metal or metal alloys or combinations thereof as described herein, or alternatively may be composed of plastic or plastic composite materials, one or more polymers, or combinations thereof. Exemplary metal or metal alloys may include aluminum, aluminum alloys, or a combination thereof. In embodiments utilizing wire feed or externally introduced printing materials, the method may include removing the printing material feed from the reservoir at certain times within the overall execution of the method in order to acquire an improved signal by the level sense detection system. The method of controlling sensing level in a liquid ejector may further include determining a maximum melt pool height prior to filling the reservoir with a printing material to a first level set point or confirming an absence of a drop out signal from the laser-based level sensor after filling the reservoir with a printing material to the second level set point in certain embodiments. The maximum melt pool height, which is the maximum height the reservoir or pump may be filled before the pump overfills, should be higher than the first level set point and the second level set point. In certain embodiments, the first level set point may be from about 4 mm to about 8 mm lower than the maximum melt pool height, and in other embodiments, the second level set point may be from about 2 mm to about 4 mm relative to the first level set point. The first level sense is level of printing material in the pump reservoir of the liquid ejector where the print job begins. The method of controlling sensing level in a liquid ejector may include adjusting the printing material level set point to a third level set point of printing material in reservoir that is higher than the second level set point and increasing the quantity of printing material in the reservoir to fill the reservoir to the third level set point, if a third level set point can be accommodated by the height and/or volume of the inner cavity of the liquid ejector, or if further level increases may be accommodated by the particular print job in operation at a time when the method for controlling sensing level in a liquid ejector is being executed. Any and all of the steps of controlling sensing level in a liquid ejector may be repeated multiple times, up to even ten times as long as the inner cavity or reservoir will accommodate additional volume and not be adversely affected by accumulated dross inside the cavity of the liquid ejector.

Alternate embodiments of methods for controlling sensing level in a liquid ejector may include filling a reservoir in communication with a liquid ejector with a printing material, reading a level signal from a surface of a melt pool in the reservoir using a sensor, coupling the level signal to the filling of the reservoir with the printing material, receiving a drop out signal from the sensor, pausing a jetting operation of the liquid ejector, increasing a quantity of printing material in the reservoir until the drop out signal is no longer received from the sensor, and resuming the jetting operation of the liquid ejector. The drop out signal is influenced by sufficient presence of dross accumulation in the pump, wherein the level sense detector reads either a zero or an erroneous signal due to a rough, scattering surface created by the dross. This may result in the printer pausing with a fault message or condition. Certain embodiments may include uncoupling the level signal from the filling of the reservoir with the printing material prior to increasing the quantity of printing material in the reservoir, and subsequently coupling the level signal to the filling of the reservoir with the printing material prior to resuming the jetting operation of the liquid ejector.

Still other exemplary embodiments of a method for controlling sensing level in a liquid ejector may include filling a reservoir in communication with a liquid ejector with a printing material to a first level set point, receiving a drop out signal from a laser-based level sensor that reads from a surface of a melt pool in the reservoir, pausing an operation of the liquid ejector, adjusting the printing material level set point to a second level set point of printing material in reservoir that is higher than the first level set point, increasing a quantity of printing material in the reservoir to fill the reservoir to the second level set point, and then resuming the operation of the liquid ejector. The method may include confirming an absence of a drop out signal from the laser-based level sensor after filling the reservoir with a printing material to the second level set point, or even repeating any and all steps in any combination or sequence as previously described herein.

As a general example, in a typical print job employing a method as described herein, the print job begins at the first level sense set point. When accumulated dross influences the level sense detector signal, causing a "drop-off" or zero reading, the print job is paused with a fault. A wire feed control for printing material is taken out of closed-loop control. The level sense set point is adjusted to a new incremental target level, for example, to a minus 2 mm, which will increase the overall pool height by 2 mm. Printing material wire is fed into the pump reservoir until the level-sense reading is at desired, elevated set point. The wire feed control is then placed back in closed-loop control, and the print job is resumed. These steps can be repeated one or more times as dross influences level-sense control, which will eventually bring the level of the pump to the "max pool height" set point. The overall level of the pool height should not negatively affect the jetting performance such that there is no degradation in print performance from rejuvenating the level sense.

Figure 5:
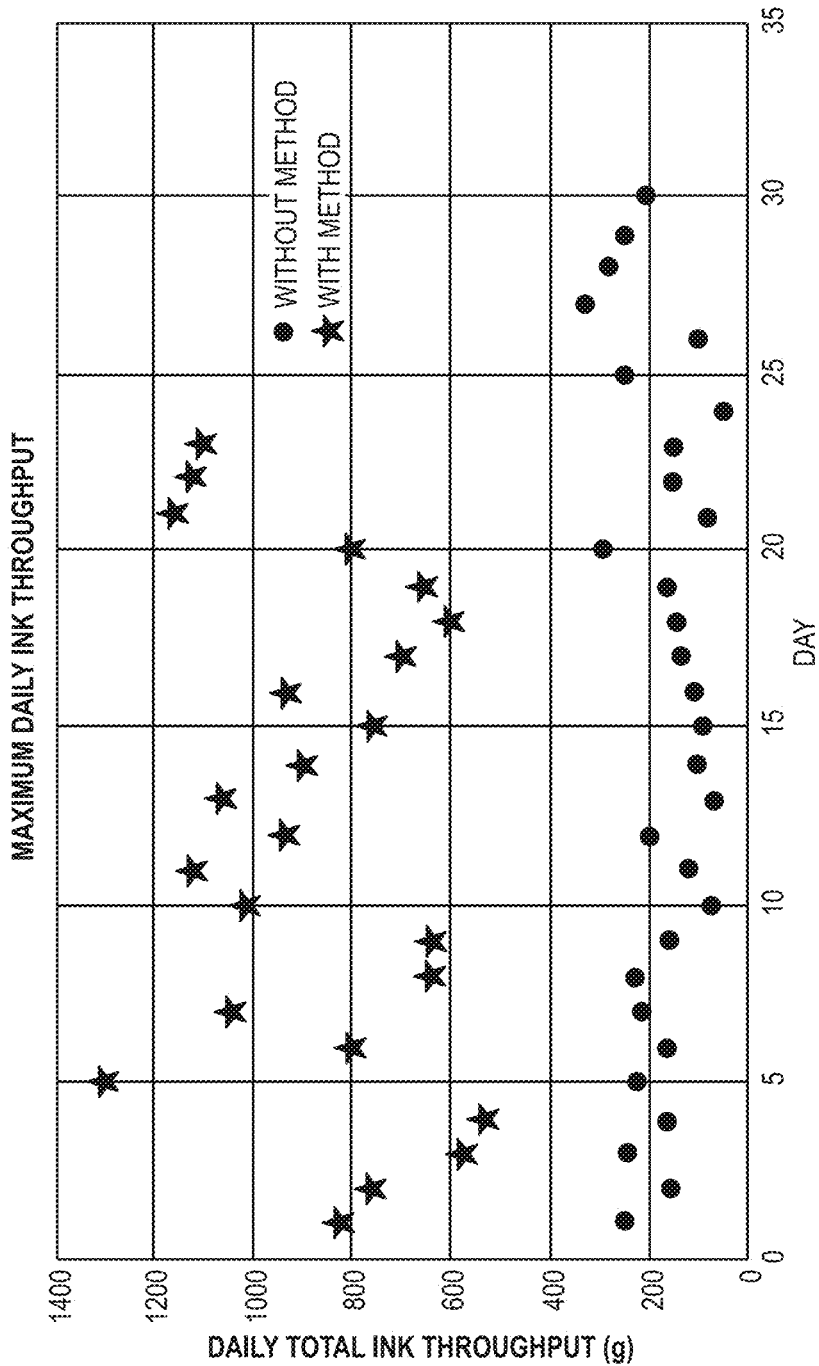
FIG. 5 is a data plot illustrating a daily total ink throughput in grams as a function of the level sensing system and method as compared to a metal jetting printer without the level sensing system and method, according to an embodiment.

FIG. 5 is a data plot illustrating a daily total ink throughput in grams as a function of the level sensing system and method as compared to a metal jetting printer without the level sensing system and method, according to an embodiment. The control scheme or method described previously has been employed and the improved performance can be seen in FIG. 5. Prior to implementation, as shown in data indicated by the circles (WITHOUT METHOD) the level-sense would fall short of a 1.25 lbs. (566.99 g) in an 8-hour time period, also characterized as a daily ink throughput. After implementation of the method, as shown in the data indicated by stars (WITH METHOD), this goal was met and some runs provided the 2+ lbs. (over 900 g) of printing in an 8-hour time period. The data illustrated in FIG. 5 clearly demonstrates the effectiveness of this method.

The method described herein provides an advantageous, "within print-job" adjustment of a target fluid setpoint level in metal jetting printing systems. A print job may be "paused" any number of times to adjust target fluid level and may be easily implemented into standard control software for a variety of metal jet printers or printers using liquid ejectors. Employing various embodiments of this method may facilitate print run time increases without shutting down due to level-sense failures, which enables and allows for larger size part builds and longer time between pump replacements. This method should also allow for maintaining jetting performance while changing pump level and improving printing system ability to measure and control the level of the melt pool height. The method may further enable running at higher pump temperatures as well, which can lead to improved jet quality, as higher temperature setpoints may lead to faster dross accumulation.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method of controlling sensing level in a liquid ejector, comprising:
   (a) filling a reservoir in communication with a liquid ejector with a printing material to a first level set point;
   (b) receiving a drop out signal from a laser-based level sensor that reads from a surface of a melt pool in the reservoir;
   (c) pausing an operation of the liquid ejector;
   (d) adjusting the printing material level set point to a second level set point of printing material in reservoir that is higher than the first level set point;
   (e) increasing a quantity of printing material in the reservoir to fill the reservoir to the second level set point;
   (f) confirming an absence of the drop out signal from the laser-based level sensor after filling the reservoir with the printing material to the second level set point; and
   (g) resuming the operation of the liquid ejector; and
   wherein the drop out signal comprises an erroneous signal from the laser-based level sensor reading scattering of light caused by contamination on the surface of the melt pool in the reservoir.

2. The method of controlling sensing level in a liquid ejector of claim 1, wherein the printing material comprises metal, metallic alloys, or a combination thereof.

3. The method of controlling sensing level in a liquid ejector of claim 1, wherein the printing material comprises aluminum, aluminum alloys, or a combination thereof.

4. The method of controlling sensing level in a liquid ejector of claim 1, wherein the printing material is a powder.

5. The method of controlling sensing level in a liquid ejector of claim 1, wherein the second level set point comprises from about 2 mm to about 4 mm relative to the first level set point.

6. The method of controlling sensing level in a liquid ejector of claim 1, further comprising:
   adjusting the printing material level set point to a third level set point of printing material in reservoir that is higher than the second level set point; and
   increasing the quantity of printing material in the reservoir to fill the reservoir to the third level set point.

7. The method of controlling sensing level in a liquid ejector of claim 1, further comprising repeating steps (a) through (g).

8. The method of controlling sensing level in a liquid ejector of claim 1, wherein the printing material is in the form of a wire feed.

9. The method of controlling sensing level in a liquid ejector of claim 2, further comprising removing the printing material wire feed from the reservoir.

10. The method of controlling sensing level in a liquid ejector of claim 1, further comprising determining a maximum melt pool height prior to filling the reservoir with the printing material to the first level set point.

11. The method of controlling sensing level in a liquid ejector of claim 7, wherein the maximum melt pool height is higher than the first level set point and the second level set point.

12. The method of controlling sensing level in a liquid ejector of claim 9, wherein the first level set point is from about 4 mm to about 8 mm lower than the maximum melt pool height.

13. A method of controlling sensing level in a liquid ejector, comprising:
   (a) filling a reservoir in communication with a liquid ejector with a printing material to a first level set point;
   (b) receiving a drop out signal from a laser-based level sensor that reads from a surface of a melt pool in the reservoir;
   (c) pausing an operation of the liquid ejector;
   (d) adjusting the printing material level set point to a second level set point of printing material in reservoir that is higher than the first level set point;
   (e) increasing a quantity of printing material in the reservoir to fill the reservoir to the second level set point;
   (f) confirming an absence of the drop out signal from the laser-based level sensor after filling the reservoir with the printing material to the second level set point; and
   (g) resuming the operation of the liquid ejector; and
   wherein the printing material comprises a wire feed comprising a metal, a metallic alloy, or a combination thereof; and
   wherein the drop out signal comprises an erroneous signal from the laser-based level sensor reading scattering of light caused by contamination on the surface of the melt pool in the reservoir.

14. The method of sensing level in a liquid ejector of claim 13, further comprising repeating steps (a) through (g).

* * * * *